(12) United States Patent
Cukier et al.

(10) Patent No.: US 6,321,245 B1
(45) Date of Patent: Nov. 20, 2001

(54) METHOD AND SYSTEM FOR PERFORMING FAST DIVISION USING NON LINEAR INTERPOLATION

(75) Inventors: Maurice Cukier; Bernard Caillet, both of Nice (FR)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/213,504

(22) Filed: Dec. 17, 1998

(30) Foreign Application Priority Data

Apr. 2, 1998 (EP) .................................. 97480097

(51) Int. Cl.[7] .............................. G06F 7/38; G06F 7/52
(52) U.S. Cl. ............................. 708/290; 708/650
(58) Field of Search ................... 708/290, 490, 708/650, 653, 656

(56) References Cited

U.S. PATENT DOCUMENTS

| | | | | |
|---|---|---|---|---|
| 3,678,258 | * | 7/1972 | Patmore et al. | 708/290 |
| 4,707,798 | * | 11/1987 | Nakano | 708/654 |
| 4,802,109 | * | 1/1989 | Machida | 708/290 |
| 5,020,014 | * | 5/1991 | Miller et al. | 708/290 |
| 5,751,611 | * | 5/1998 | Jamieson | 708/290 |
| 6,128,637 | * | 10/2000 | Yasui et al. | 708/290 |

\* cited by examiner

*Primary Examiner*—Tan V. Mai
(74) *Attorney, Agent, or Firm*—Joscelyn G. Cockburn; John B. Frisone (57) ABSTRACT

The present invention discloses a method and a system for performing fast division using non linear interpolation. A storage stores x-axis and y-axis coordinates (X0, Y0) of a plurality of non uniform interpolation points, and x-axis and y-axis coordinates ($\Delta X$, $\Delta Y$) representing the differences between two successive points of the plurality of non uniform interpolation points is used. The plurality of non uniform interpolation points is selected such that the x-axis difference ($\Delta X$) is a power n of 2 in the form of ($\Delta X = 2^n$), with n being an integer. Upon reception of an input operand X, the storage selects and outputs a set of coordinates (X0, $\Delta Y$, n, Y0) associated to the input operand. Correcting circuits are connected to the output of the storage to compute a correction factor $$(X - X0) \times \frac{\Delta Y}{\Delta X}$$

from the set of coordinates. Adders are connected to the output of the correcting circuits to add the computed correction factor $$(X - X0) \times \frac{\Delta Y}{\Delta X}$$

to the corresponding y-axis coordinate (Y0) to achieve the division.

6 Claims, 5 Drawing Sheets

METHOD AND SYSTEM FOR PERFORMING FAST DIVISION USING NON LINEAR INTERPOLATION

TECHNICAL FIELD

The present invention relates to traffic management in communication networks, and more particularly to a method and system for performing fast division in the computation of the delay between data to be transmitted.

BACKGROUND ART

The function of traffic management is to control the use of network resources, optimizing network utilization and avoiding bottlenecks in the network. Various devices interfacing a network send and receive data on link connections. One important function in the high speed networks is to control the rate at which the data are delivered over the links.

In the so-called Asynchronous Transfer Mode (ATM) Networks the data are called ATM cells and transit over physical links in the network from endpoints to endpoints through internal nodes (also called switches) which route the cells to their destination endpoint. The cells within either a endpoint or a node are temporarily stored before being admitted on a link. Among the different parameters determining which one and the moment at which a new cell is to be output, the current cell rate (CCR) is mandatory. The computation of this parameter which is also expressed as a delay (the inter-cell delay) includes the step of performing a division.

Since the division belongs to an interactive process, the duration of this operation must be minimized. There are several families of dividers: dividers using iterations, dividers using logarithms and fully combinatorial dividers.

The dividers using iteration perform the operation thanks to a succession of subtractions and shift operations. These circuits generate the exact value of the division but they require several cycles to compute the result. The number of steps necessary to compute the result equals the number of bits of the divisor operand. These circuits are too slow for high speed network applications.

The dividers using logarithms require very large memory tables. This type of circuits are resources consuming.

The fully combinatorial dividers circuits require expensive circuitry. Moreover this type of circuits is not adapted to the high speed networks because they are not fast enough.

Another known combinatorial approach is based on a process using the so-called non restoring array divider as defined by H. H. Guild in "Some Cellular Logic Arrays for Non restoring Binary Division" the Radio and Elect. Engr., Vol. 39 June 1970, using controlled Adder/Subtracter cells. Such technique is hardware consuming and is sized to a precise shape of dividend/divisor, say a 32 bits/16 bits or any combination of (2 n bits/n bits).

The general state of the prior art with respect to solving the aforementioned division problem may be best illustrated and understood with reference to the several patents to be described immediately hereinafter.

U.S. Pat. No. 4,228,518 from Chamberlin discloses a microprocessor having the capability of performing either a multiply or divide operation from a single instruction for each operation. Standard circuitry of a microprocessor is used along with a multiply/divide cycle counter, logic circuitry, and a shift network separate from the arithmetic logic unit. The microprocessor has the capability of performing unsigned integer multiplication and division. A shift and add algorithm is used for multiplication while for division a non-restoring divide algorithm is used. While this circuit does not occupy a great amount of additional circuitry on the microprocessor, several cycles of operation are needed to complete the division.

U.S. Pat. No. 4,707,798 from Nakano discloses a divide method and a divide apparatus for use in a data processing system by employing interpolation approximation. The divisor and the dividend are normalized in a normalization circuit. A table unit stores a plurality of approximate reciprocal divisors and differences between adjacent approximate reciprocal divisors and is addressed by the high-order bits of the normalized divisor. The approximate reciprocal divisor read out from the table unit is, in an interpolation approximation circuit, changed into an interpolation approximated approximate reciprocal divisor in accordance with a plurality of bits following the high-order bits and the difference. A multiplication unit multiplies the interpolation approximated approximate reciprocal divisor by the normalized dividend to obtain through successive iterations a quotient.

U.S. Pat. No. 5,068,816 from Noetzel discloses a function evaluator which uses an interpolating memory for evaluating functions. An argument is expressed in digital bits. High order bits are used to address a memory for selecting coefficients. Low order bits are used in combinational logic to supply powers which multiply the coefficients. An adder sums the products of the multipliers, and the summation is the function evaluation. This solution is hardware consuming because the apparatus is not limited to the division. The correction factor value is important due to the fact that the segments have all the same size, as will be explained later in the description.

The main characteristics of the prior art solutions are that a precise result of the division is sought which need several cycles of operations in order to apply corrections to an estimated result.

Therefore the circuits of these references are not acceptable for the present applications of very high speed networks in which the main constraint is the delay and not the accuracy.

Accordingly, it would be desirable to be able to provide a new method and system to evaluate an approximation of a division which eliminates the aforementioned constraint of delay and complexity of present solutions.

SUMMARY OF THE INVENTION

It is an object of this invention to provide a low cost high speed divider for achieving fast divisions performed in one clock cycle.

In a preferred embodiment such an apparatus uses an approximation method based on a non linear interpolation technique. An hyperbola curve in the form of $$Y = \frac{N}{X}$$

where N is a constant and X is the divisor operand, is parted into unequal segments and stored in a table. The value of each segment ($\Delta X$, $\Delta Y$) is not equal. The segments are smaller in the region of the hyperbola where the variation of Y is important, while the segments are longer in the region where the variation of Y is less. Moreover the sizes of the segments are predefined to always be an integer power of 2.

Another object of the invention is an adaptable fast divider wherein the number of interpolation points is fixed in order to provide the lower hardware cost for a required admissible error.

The system of this invention is particularly directed to a fast division circuit without great accuracy, which is acceptable in adaptive processes. The present invention provides a dividing apparatus for use in a high speed ATM network in order to compute the delay between ATM cells.

In a preferred embodiment, the dividing apparatus comprises means for storing x-axis and y-axis coordinates (X0, Y0) of a plurality of non uniform interpolation points, and x-axis and y-axis coordinates (ΔX, ΔY) representing the differences between two successive points of the plurality of non uniform interpolation points. As stated above, the plurality of non uniform interpolation points are selected such that the value of the x-axis differences (ΔX) is a power n of 2 in the form of (ΔX=$2^n$) with n being an integer. Upon reception of an operand value X input to the storing means, a set of coordinates (X0, ΔY, ΔX, Y0) representing one of the plurality of the non uniform interpolation points is selected to be associated to the input value, and is output from the storing means. A correction factor $$(X - X0) \times \frac{\Delta Y}{\Delta X}$$

is computed from a first part of the set of coordinates, and is added to the y-axis coordinate (Y0) of the set of coordinates to achieve the division. The dividing apparatus further comprises means for determining the plurality of non uniform interpolation points to be stored in preferably a Programmable Logic Array.

Preferably the correcting means comprises adder means to generate a first x-axis term (X–X0) representing the x-axis difference between the input operand and the selected x-axis coordinate, multiplier means connected to the output of the adder means to generate a second term, representing the product of the first x-axis term by the y-axis difference (X–X0)×ΔY, and shifter means connected to the output of the multiplier means to generate the correction factor $$(X - X0) \times \frac{\Delta Y}{\Delta X}$$

by dividing the second term by the x-axis difference.

Finally, it is also an object of the invention to provide a method for performing fast division comprising the steps of:

storing x-axis and y-axis coordinates (X0, Y0) of a plurality of non uniform interpolation points, and x-axis and y-axis coordinates (ΔX, ΔY) representing the differences between two successive points of the plurality of non uniform interpolation points, the plurality of non uniform interpolation points being such that the differences (ΔX) being a power n of 2 in the form of (ΔX=$2^n$) with n being an integer;

selecting from the storing means a set of coordinates (X0, ΔY, n, Y0) of one of the plurality of the non uniform interpolation points, to be associated to an operand value X input to the storing means;

computing a correction factor $$(X - X0) \times \frac{\Delta Y}{\Delta X}$$

from a first part of the set of coordinates; and adding the computed correction factor $$(X - X0) \times \frac{\Delta Y}{\Delta X}$$

to the y-axis coordinate (Y0) of the set of coordinates to achieve the division.

DETAILED DESCRIPTION OF THE INVENTION

Figure 1:
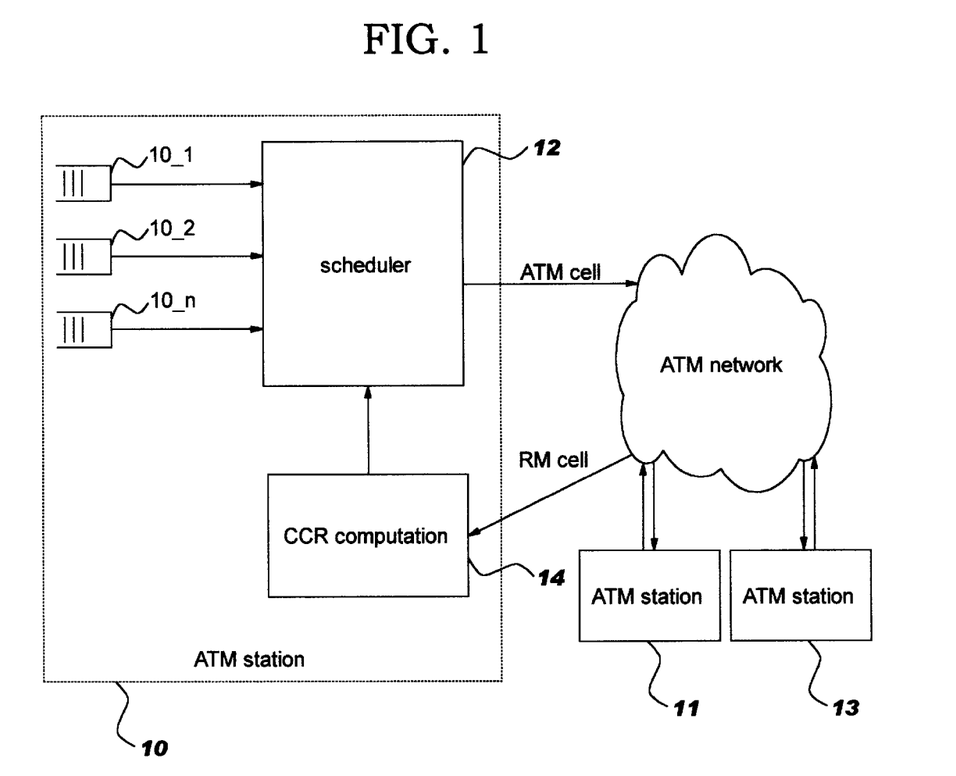
FIG. 1 shows a high speed network environment in which the invention applies.

FIG. 1 shows ATM stations (10,11,13) linked to an ATM network by physical links. The ATM cells are transmitted towards the ATM network through the physical link. As fully described in the 'Asynchronous Transfer Mode' A Technical Overview, International Business Machine (Ref. SG24-4625-00) Second Edition October 1995, the header of an ATM cell contains several fields, two of which being the so-called VP (virtual path) and VC (virtual channel). The (VP/NVC) defines the route between the transmitting device and the receiving one.

An ATM network offers different services classes for the transmission of different types of traffic:

The Constant Bit Rate Service is a reserved bandwidth service, where a contract is established with the network. The user provides to the network a set of parameters describing the traffic to be sent over the connection. These parameters are:

PCR Peak Cell Rate indicating the aggregated traffic the user is going to transmit, irrespective of the value of the cell loss priority;

CLR Cell Loss Ratio indicating the admissible number of lost cells for a connection;

CDVT Cell Delay Variation Tolerance indicating the maximum variation in the delay that the network must support.

The ABR service defines a network dynamically allocated bandwidth to each (VP/VC) via the transmission of Resource Management cells (RM cells). A complete description of the ABR service can be found in the ATM Forum Traffic Management Specification. Mainly, ABR is a mixed reserved and non-reserved bandwidth service, ensuring a minimum bandwidth. This minimum guaranteed bandwidth is called the minimum cell rate (MCR). The most important parameters signaled for ABR connections are (PCR) and (MCR), indicating the maximum transmission rate allowed and the minimum guaranteed transmission rate required. ABR service is used mainly for data applications that require a minimum of quality of service to avoid session time-outs.

An ATM station is able to handle several concurrent (VP/VC) on the same physical link, each (VP/VC) having its own dynamic bandwidth defined by the three parameters expressed in cells per second:

PCR Peak Cell Rate

MCR Minimum Cell Rate

CCR Current Cell Rate, wherein the CCR value is always smaller than PCR, and always greater than MCR.

Referring again to FIG. 1, an ATM station (10) comprises a plurality of storing means (10-1,10-2,10-n) wherein ATM cells are stored. Each of these queues contains ATM cells for a single (VP/VC) destination. These queues are emptied through a scheduler (12) taking into account the measurement of the traffic in the network. The measurement of the traffic is reported to the ATM station thanks to the (RM) cells which are input to a cell rate computation circuit (14). The new intercell delay is computed within the CCR circuit (14) which thereafter transmits the result to the scheduler to select the next cell to be transmitted.

In the payload of an ATM (RM) cell, there are two bits called CI (congestion indication) and NI (not increase). The current cell rate is adapted according to the value of these bits.

When CI bit equals 1 the ATM source station must reduce the current cell rate $CCR_i$ for the corresponding (VP/VC) according to the following formula:

$$CCR_i = \max(MCR_i, CCR_i - CCR_i \times RDF),$$

wherein RDF is the Rate Decrease Factor representing the reduction factor which is applied to the current cell rate for the current (VP/VC).

When CI=0 and NI=0 the ATM source station may increase the current cell rate for this corresponding (VP/VC) according to the following formula:

$$CCR_i = \min(PCR_i, CCR_i + AIR_i),$$

wherein $$AIR_i = PCR_i \times RIF,$$

with RIF being the Rate Increase Factor.

Therefore, for each (VP/VC) the current cell rate is constantly updated following the traffic variation in the network indicated by the RM cells. The current cell rate must be instantaneously converted into a delay so-called 'inter-cell delay', defined by the following formula:

$$intercell_i = \frac{N_l}{CCR_i},$$

wherein $N_l$ is the number of cells carried by the link in one second. This delay is expressed in terms of cell times.

The problem to adapt the current cell rate, is that as soon as an ATM cell has been sent to the network, the scheduler must choose from which queue it should take the next cell to be sent. In order to make this decision, the scheduler needs to know the values of the inter-cell delay for every queue (VP/VC). A dedicated hardware is required to perform fast divisions. Since the adjustment of the traffic is an adaptive process, the result of the division may tolerate an approximation of the exact value.

Moreover the division process must be instantaneous. Due to the speed of the link and the mix of several type of traffics (one traffic per VP/VC), the ATM station may have to process adjacent RM cells corresponding to several (VP/VC). Thus to avoid the complexity of a pipeline structure, the process of computation of each new current cell rate including the computation of each new inter cell delay for the current (VP/VC) and the selection of the cell to be sent among all possible (VP/VC) has to be done in the time of the reception of one cell.

In the most actual technologies, the delay for receiving a cell is about 700 nanoseconds on a link having a speed of 622 Mbps. During this delay, the ATM station should perform the following operations:

1. compute the current cell rate $CCR_i$;
2. compute the new inter cell delay for the current (VP/VC) used by the scheduler:

$$intercell_i = \frac{N_l}{CCR_i},$$

wherein $N_l$ the number of ATM cells carried in one second may vary according to the speed of the link:

at a speed of 155 Mbps: $N_l$=353,207 at a speed of 622 Mbps: $N_l$=1,412,830

4. encode the new CCR into a floating point format for the forward RM cell which will be sent to the network;
5. evaluate the eligibility of each (VP/VC);
6. perform the selection of a cell to be sent among the eligible (VP/VC)'s.

The division operation is now explained with reference to FIGS. 2 and 3. For the convenience of the description, the value of the input data are expressed as algebraic values, but the skill man will readily understand that the method applies to other value representation such as binary representation.

Figure 2:
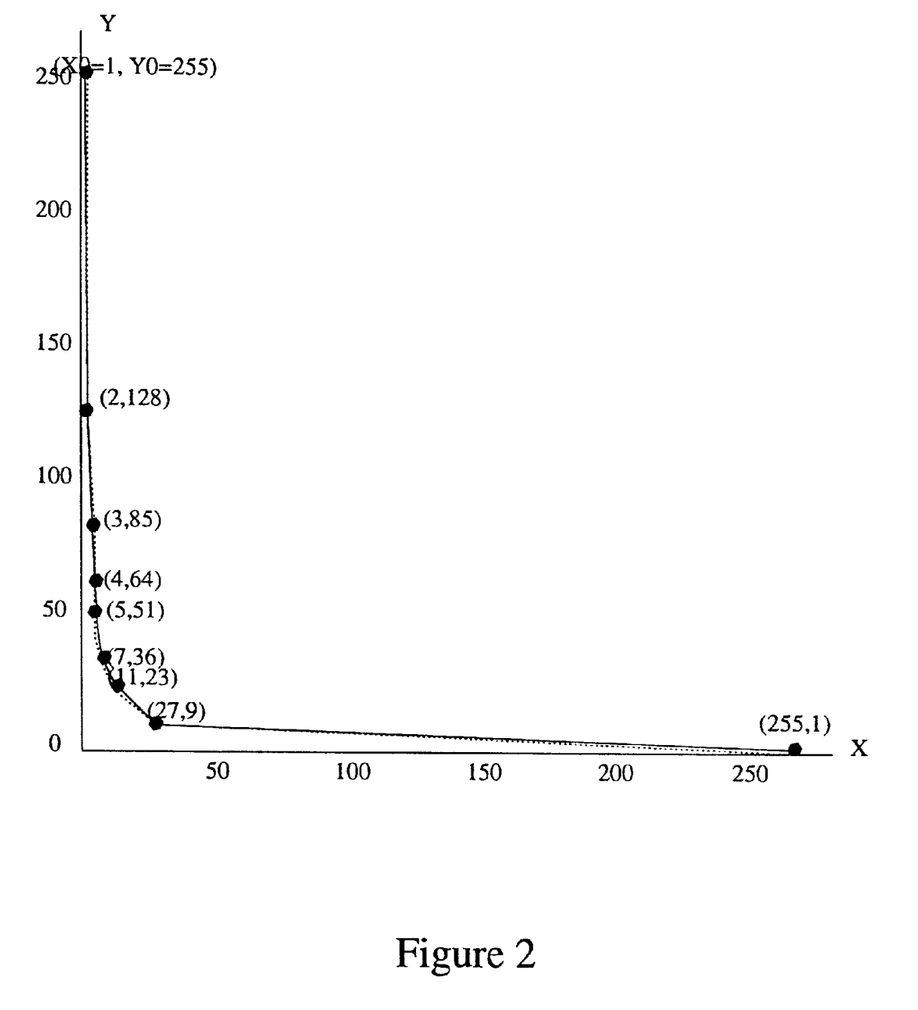
FIG. 2 shows an example of an hyperbola curve having irregular size segments.

FIG. 2 shows a simplified non uniform interpolation hyperbola for values increasing from 0 to 255. It is to be understood that this example is just for understanding of the invention, but the same applies to any range of values. In the case of the previously cited ATM environment, the values would be in the range of (Ø to 353,207) which corresponds to a speed of the link of 155 Mbps.

The curve of FIG. 2 is illustrated as having nine points for the purpose of the example. Eight segments are therefore defined within the curve. The points are spaced by non equal segments, and each point of the curve is defined by a couple of coordinates (X0,Y0). For example, the coordinates of the first point at the top of the curve is (X0=1,Y0=255). Others coordinates are listed in table 1. A segment between two points is defined by a couple of coordinates (ΔX, ΔY) and for example, the segment between the first point of the curve (1,255) and the second point of the curve (2,128) is defined by $$(\Delta X = 2-1 = 1; \Delta Y = 128 - 255 = (-)127).$$

For clarity, the positive values of ΔY are stored in table 1, while the last stage of the circuit performs the subtraction.

Others segments coordinates are listed in the following table 1.

The selection of the points on the curve is made according to a selection algorithm which is detailed hereinafter with reference to FIG. 4.

TABLE 1

| X0 | Y0 | ΔX | n | ΔY |
|----|-----|----|---|-----|
| 1  | 255 | 1  | 0 | 127 |
| 2  | 128 | 1  | 0 | 43  |
| 3  | 85  | 1  | 0 | 21  |
| 4  | 64  | 1  | 0 | 13  |
| 5  | 51  | 2  | 1 | 15  |
| 7  | 36  | 4  | 2 | 13  |

TABLE 1-continued

| X0 | Y0 | ΔX | n | ΔY |
|----|----|----|----|----|
| 11 | 23 | 16 | 4 | 14 |
| 27 | 9 | 256 | 8 | 8 |

One feature of the value of the segments are chosen to be equal to an integer which is a power of 2, i.e. in the form of ΔX=$2^n$. For example, the value of ΔX=1 is related to n=0; the value of ΔX=2 is related to n=1.

It has to be noted that generally the value of the last segment of the curve is forced to be an integer value, ΔX=256 in the illustrated case, which is a power of 2, instead of the real value which is 255−27=228 in our case. The indicated value of 256 is the integer power of 2 which is the closest of 228.

Figure 3:
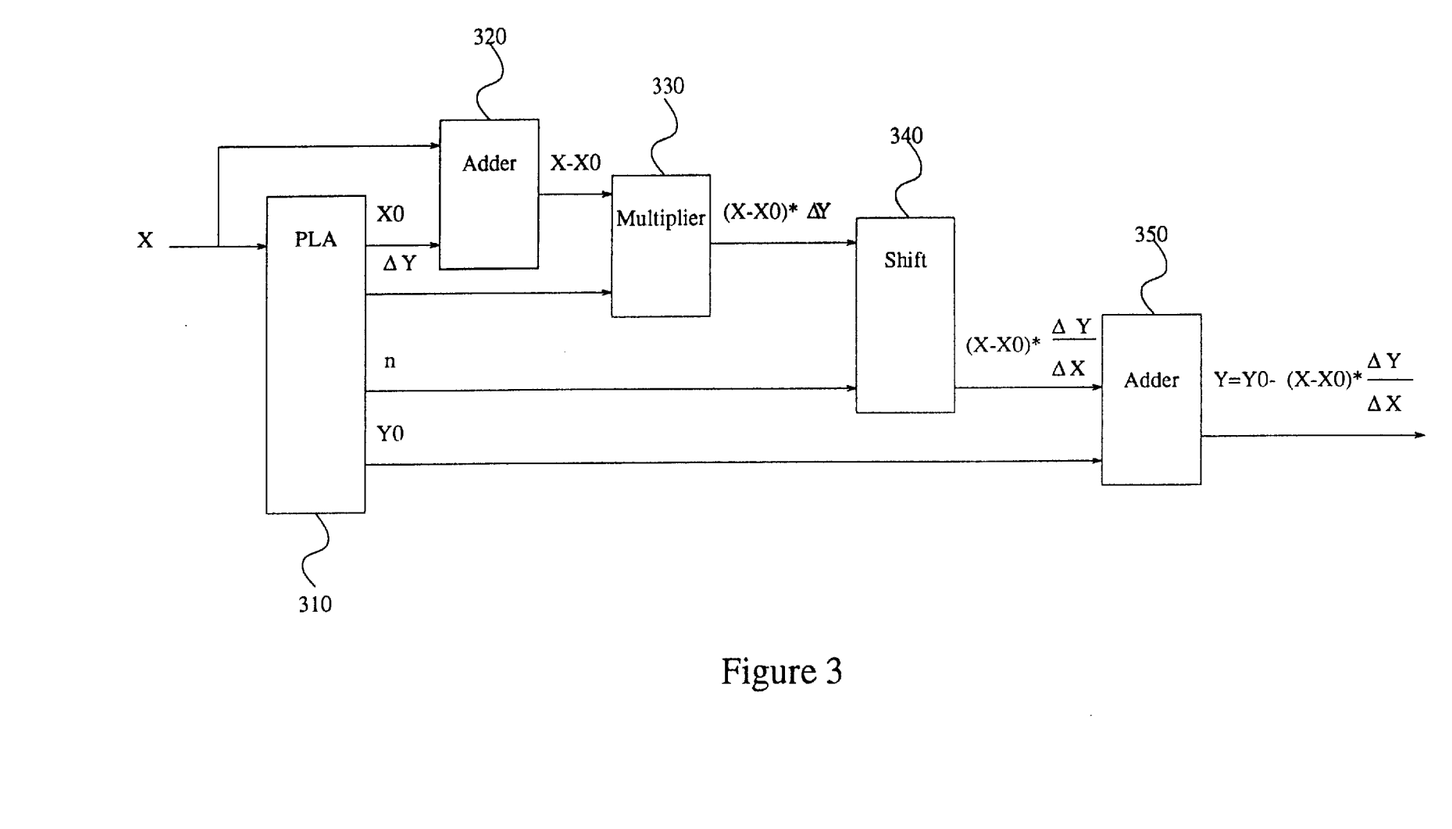
FIG. 3 shows a preferred embodiment of the circuit of the invention.

Referring to FIG. 3, an implementation of the system of the invention is now described, comprising storage 310, adder (320,350), multiplier 330 and shifter 340. Briefly, the computation of $$Y = \frac{K}{X}$$

is approximated by the formula $$Y = (X - X0) \times \frac{\Delta Y}{\Delta X} + Y0,$$

wherein Y0 is the ordinate which corresponds to the greatest X0 point which is smaller than X. In the formula, $$(X - X0) \times \frac{\Delta Y}{\Delta X}$$

is a correcting factor. The computation is performed in a combinational way using adding, multiplying and shifting functions.

The value of 'X' is first entered into the storage 310, preferably a so-called Programmable Logic Array (PLA) wherein the values of the selected points of the hyperbola curve are stored. The value of 'X' is then compared to the stored values.

If it matches with one of the stored values of X0, then the corresponding stored values (X0,ΔY,n,Y0) are output, and =X0.

If it does not matches with one of the stored values, then the corresponding smallest stored value of X0 is retained for X and the corresponding values (X0, ΔY, n, Y0) are output. For example, if the value of X is 10, then the chosen smallest value as regard to Table 1 will be 7, and the corresponding coordinates to be output will be (X0=7,ΔY=13,n=2,Y0=36).

Next, the adder 320 inputs both the values of 'X' and 'X0'. The resulting adding 'X−X0' is then input to the multiplier 330. The multiplier also inputs the value of 'ΔY' to deliver the resulting multiplied factor '(X−X0)×ΔY'.

The next step consists in dividing the previously multiplied factor by the 'ΔX' value. However, as previously explained these values has been specifically chosen to be equal to a power of 2. Thereby, the division by 'ΔX=$2^n$' is reduce to a dropping of the 'n' last significant bits of the dividend. Therefore, circuit 340 is a shifter inputting both the multiplied factor calculated in circuit 330, and the value of 'n' output from the storing circuit 310. The correcting factor is then output from the shifter.

In the last step, the correcting factor is added to the value of 'Y0'. The adder circuit 350 inputs both the correcting factor and "Y0" which is output from the storing circuit 310. The final value 'Y' is then output.

In order to illustrate, example is made on a division of $$\left(\frac{255}{10}\right)$$

with 'X' being equal to 10. Referring back to Table 1, the smallest corresponding value is X0=7. Reading the corresponding row gives ΔY=13;n=2; Y0=36.

The output of adder 320 is then 'X−X0=10−7=3'.

The output of multiplier 330 is '(X−X0)×ΔY=3×13=39'.

The output of shifter 340 gives the value '9' which is the result of the integer division of 39 by 4, which is obtained by dropping the two last significant bits of the value '39' expressed in binary mode as '100111', thereby giving '1001' or '9' in decimal.

Finally, the adder 350 delivers the value of "Y" to be equal to '36−9=27'. This result is to be compared to the exact value of '25' which could be obtained after successive iterations.

It is important to note that the range of ΔY operand of the multiplier is limited according to the number of points chosen on the hyperbola, thereby optimizing the size of the circuitry.

Figure 4:
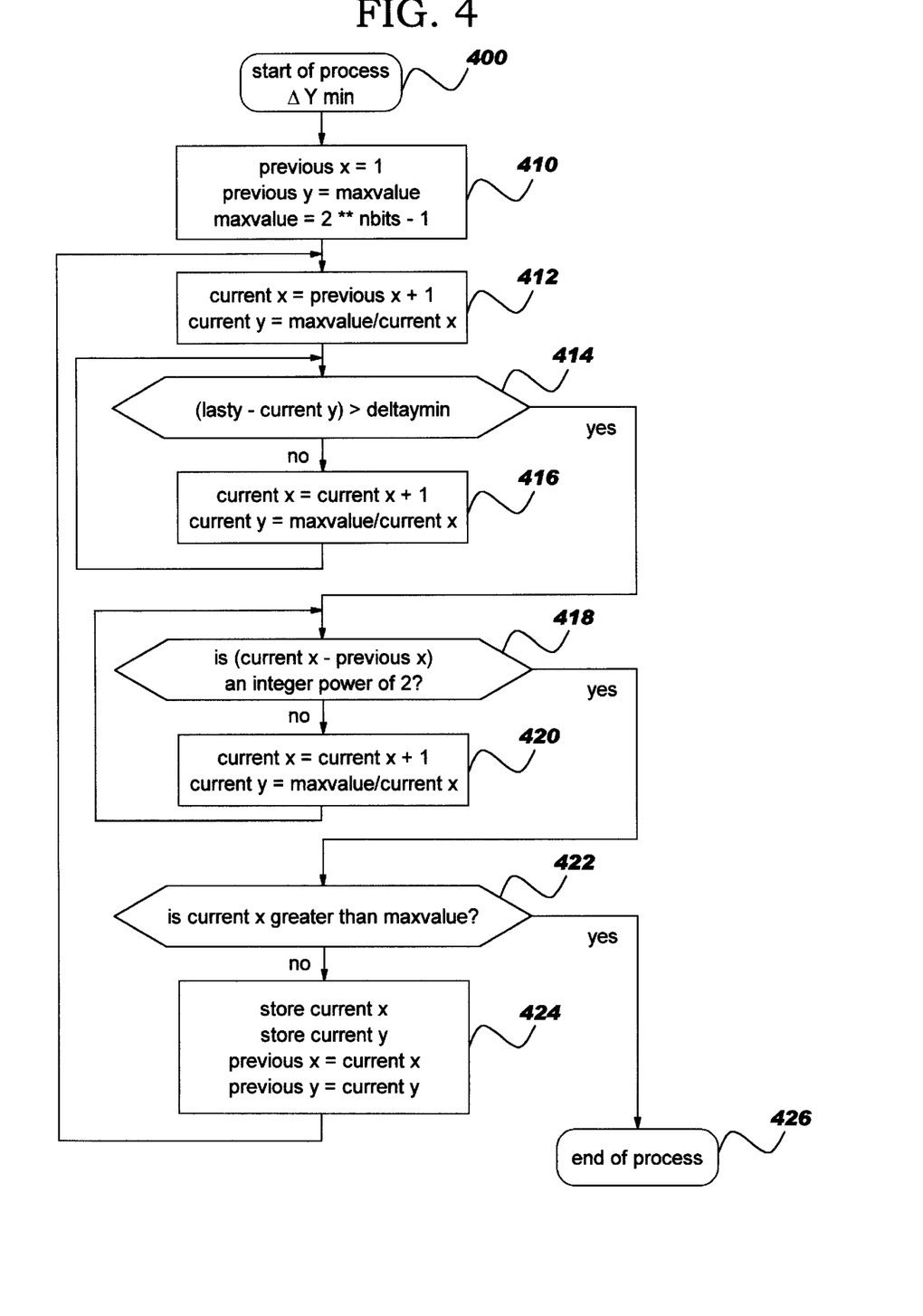
FIG. 4 shows the flow chart of the process for determining the interpolation points.

Referring now to FIG. 4, a process to determine the interpolation points is described. It has to be noted that the number of selected points determines the approximation exactitude. If more and more points are desired, the sizes of the segments are smaller and the approximation result is then better. However, selecting a large number of points required a large storage, but on the other hand the circuits used to perform the correction are small in size. The right selection is made according to each specific application.

In the first block (400), a parameter ΔY min indicating the minimum value between two successive points of the curve is defined.

Steps (410) to (416) allow to compute the successive points X0 by incrementing the current value of X until the variation of Y becomes greater than ΔY min.

The first point of the table corresponds to X0=1.

After the first part of the process, the algorithm checks whether the variation of X, (ΔX) is an integer power of 2 during steps (418) to (424).

If it is not the case (branch NO of step 418) X is incremented (step 420) until it fulfills the condition.

When the condition is met (branch YES of step 418), the coordinates X0 and Y0 are stored (step 424) in the storing means.

Finally, the process is repeated for each point, until the value of X reaches or exceeds the maximum value ($2^m$−1) of the curve (step 422).

The hardware cost of the divider is not always increasing with the number of points. If the chosen technology allows dense PLAs, increasing the number of points can decrease the cost, since the sizes of multiplier and adders associated with the PLA decrease.

In order to compare the performance of the system of the invention with known systems of the prior art, example is taken with an hyperbola divided into 8 equal segments, and wherein X is coded with 8 bits.

The coordinates of the points are given below:

| X0  | Y0  | ΔX | ΔY  |
|-----|-----|----|-----|
| 1   | 255 | 35 | 248 |
| 36  | 7   | 36 | 4   |
| 73  | 3   | 36 | 1   |
| 109 | 2   | 36 | 1   |
| 146 | 2   | 36 | 1   |
| 182 | 1   | 36 | 0   |
| 219 | 1   | 36 | 0   |
| 255 | 1   | 36 | 0   |

For an input of X=10, the background art interpolation would give after one clock cycle the following result:

| X0 | 1 |
| Y0 | 255 |
| ΔX | 35 |
| ΔY | 248 |
| (X − XO) × ΔY = D1 | 2,232 |
| $D2 = \dfrac{D1}{\Delta X}$ | 63 |
| Y = Y0 − D2 | 192 |

The result obtained with the system of the invention is Y=27 as previously described, which is much closer to the exact value. In addition, it has to be mentioned that dividing by 35 as required in the prior art system is far more costly than a division by an integer power of 2 as proposed in the present invention.

In another embodiment of the invention, the system is improved by using the so-called Booth encoding technique which allows to reduce the number of terms to be added in order to obtain the result of a multiplication.

For instance, if a multiplier contains 8 bits, the Booth encoding technique allows to reduce the number of terms to 4 rather than having 8 terms to be added. A complete description of the Booth technique is to be found in the IBM Technical Report No. 49413, dated May 14, 1990 and titled 'Benefits of BiCMOS in array multiplier'.

Figure 5:
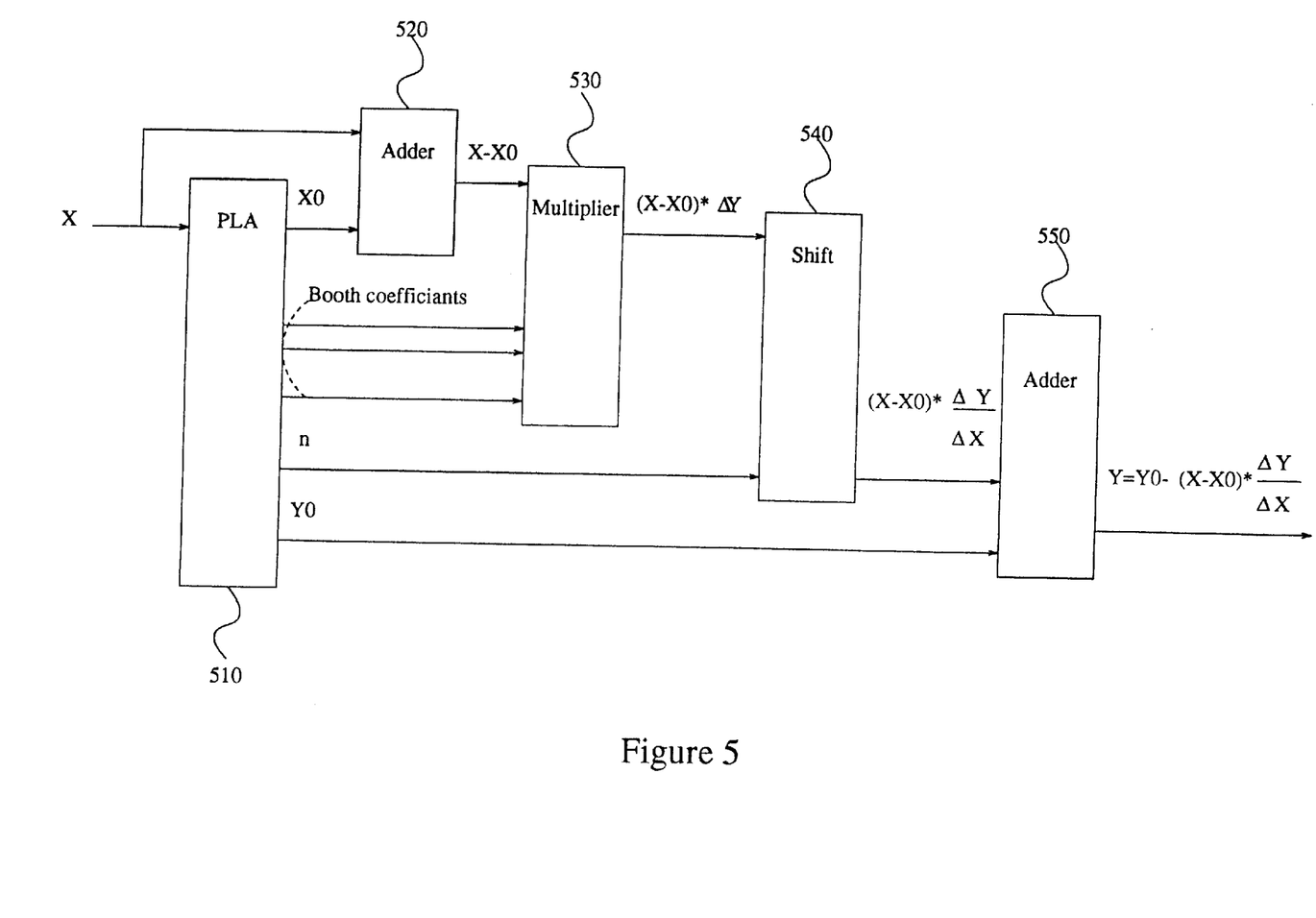
FIG. 5 shows an improvement to the circuit of FIG. 3 using Booth algorithm.

Preferably, as shown on FIG. 5, the Booth system is implemented within the storing circuit. The Booth coefficients generated by the Booth system are input to the multiplier which performs a simplest multiplication of the two terms (X−X0)×ΔY.

What is claimed is:

1. An apparatus for interpolating the Y coordinate of a non-linear function which has been divided into a plurality of non-uniform concatenated segments from a single variable X, each of the concatenated segments having an origin identified by the coordinates X0, Y0, a value ΔX and ΔY which are the linear distances in the X and Y direction, respectively, to the origin of the next concatenated segment, ΔX being set equal to $2^n$ where n is an integer comprising:

a memory including the X0 and Y0 coordinates and the ΔY and n values of each of the segments;

first means for receiving a variable X and selecting from the memory and providing the X0 coordinate closest to but not greater than the variable X and the Y0, ΔY and n values associated therewith;

second means responsive to X and the first means for deriving and providing the sum X−X0*ΔY;

third means responsive to the second means and to the value n from the first means for shifting the value X−X0*ΔY provided by the second means by n orders; and, fourth means responsive to the shifted value from the third means and to Y0 from the first means for adding them to provide the Y coordinate corresponding to the variable X.

2. The apparatus of claim 1 wherein the memory is a Programmable Logic Array.

3. An apparatus for interpolating the Y coordinate of a non-linear function which has been divided into a plurality of non-uniform concatenated segments from a single variable X, each of the concatenated segments having an origin identified by the coordinates X0, Y0, values ΔX and ΔY which are the linear distances in the X and Y direction, respectively, to the origin of the next concatenated segment, ΔX being set equal to $2^n$ where n is an integer comprising:

a memory including the X0 and Y0 coordinates and the ΔY and n values of each of the segments;

first means for receiving a variable X and selecting from the memory and providing the X0 coordinate closest to but not greater than the variable X and the Y0, ΔY and n values associated therewith;

second means responsive to X and the first means for deriving and providing the sum X−X0*ΔY;

third means responsive to the second means and to the value n from the first means for shifting the value X−X0*ΔY provided by the second means by n orders whereby the sum X−X0*ΔY/ΔX is obtained without the use of conventional division; and, fourth means responsive to the shifted value from the third means and to Y0 from the first means for adding them to provide the Y coordinate corresponding to the variable X.

4. The apparatus of claim 3 wherein the memory is a Programmable Logic Array.

5. A method for interpolating the Y coordinate of a non-linear function from a single variable X comprising the following steps:

dividing the function into a plurality of non-uniform concatenated segments, each of which have an origin identified by the coordinates X0 and Y0;

selecting for each segment value ΔX and ΔY which are the linear distances in the X and Y direction to the origin of the next concatenated segment and for each segment setting ΔX equal to $2^n$ where n is an integer;

storing in a memory the X0 and Y0 coordinates and the ΔY and n values of each of the segments;

receiving a variable X and selecting from the memory the X0 coordinate closest to but not greater than the variable X and Y0, ΔY and n associated therewith;

calculating the sum X−X0*ΔY;

shifting the sum X−X0*ΔY by n orders; and, adding Y0 to the shifted sum X−X0*ΔY to provide the Y coordinate corresponding to the variable X.

6. A method for interpolating the Y coordinate of a non-linear function from a single variable X comprising the following steps:

dividing the function into a plurality of non-uniform concatenated segments, each of which have an origin identified by the coordinates X0 and Y0;

selecting for each segment value $\Delta X$ and $\Delta Y$ which are the linear distances in the X and Y direction to the origin of the next concatenated segment and for each segment setting $\Delta X$ equal to $2^n$ where n is an integer;

storing in a memory the X0 and Y0 coordinates and the $\Delta Y$ and n values of each of the segments;

receiving a variable X and selecting from the memory the X0 coordinate closest to but not greater than the variable X and Y0, $\Delta Y$ and n associated therewith;

calculating the sum $X-X0*\Delta Y$;

shifting the sum $X-X0*\Delta Y$ by n orders whereby the sum $X-X0*\Delta Y/\Delta X$ is obtained without the use of conventional division; and, adding Y0 to the shifted sum $X-X0*\Delta Y$ to provide the Y coordinate corresponding to the variable X.

* * * * *